(12) United States Patent
Tokunaga

(10) Patent No.: US 11,841,720 B2
(45) Date of Patent: Dec. 12, 2023

(54) FLOW RATE CONTROLLER, FLOW RATE CONTROL METHOD, AND PROGRAM RECORDING MEDIUM FOR FLOW RATE CONTROLLER

(71) Applicant: HORIBA STEC, Co., Ltd., Kyoto (JP)

(72) Inventor: Kazuya Tokunaga, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 0 days.

(21) Appl. No.: 18/051,637

(22) Filed: Nov. 1, 2022

(65) Prior Publication Data

US 2023/0168697 A1 Jun. 1, 2023

(30) Foreign Application Priority Data

Nov. 30, 2021 (JP) ................................ 2021-194040

(51) Int. Cl.
| | |
|---|---|
| G05D 7/06 | (2006.01) |
| F16K 31/02 | (2006.01) |
| G01F 1/34 | (2006.01) |
| F16K 31/00 | (2006.01) |
| G01F 15/00 | (2006.01) |
| G05B 11/42 | (2006.01) |

(52) U.S. Cl.
CPC .......... *G05D 7/0647* (2013.01); *F16K 31/007* (2013.01); *F16K 31/02* (2013.01); *G01F 1/34* (2013.01); *G01F 15/005* (2013.01); *G05B 11/42* (2013.01); *G05D 7/0623* (2013.01); *G05D 7/0635* (2013.01); *G05D 7/0641* (2013.01)

(58) Field of Classification Search
CPC .... G05D 7/0647; G05D 7/635; G05D 7/0641; G05D 7/0623; G01F 1/34; G01F 15/005; G01L 13/00; G05B 11/42; F16K 31/02; F16K 31/007
USPC ...... 137/12, 487.5, 488; 156/345.24, 345.26, 156/345.15
See application file for complete search history.

(56) References Cited

U.S. PATENT DOCUMENTS

| | | | | |
|---|---|---|---|---|
| 5,190,068 | A * | 3/1993 | Philbin | .................... G05D 7/06 137/487 |
| 8,109,289 | B2 * | 2/2012 | Trnka | .................. F24D 19/1015 700/282 |
| 8,601,976 | B2 * | 12/2013 | Nishino | ............ C23C 16/45561 118/704 |

(Continued)

FOREIGN PATENT DOCUMENTS

JP 2004280688 A 10/2004

*Primary Examiner* — Minh Q Le
(74) *Attorney, Agent, or Firm* — Alleman Hall Creasman & Tuttle LLP

(57) ABSTRACT

Provided is a flow rate controller. The flow rate controller calculates a resistor flow rate that is a flow rate of a fluid flowing through a fluid resistor, on the basis of a first measured pressure measured by a first pressure sensor and a second measured pressure measured by a second pressure sensor; controls a second valve on the basis of a deviation of the resistor flow rate from the set flow rate; outputs a first set pressure that is a target of a pressure upstream of the fluid resistor, on the basis of the set flow rate and a second set pressure which is a target of a pressure downstream of the fluid resistor and to which a constant value is set; and controls the first valve on the basis of a deviation of the first measured pressure from the first set pressure.

13 Claims, 5 Drawing Sheets

(56) References Cited

U.S. PATENT DOCUMENTS

| | | | |
|---|---|---|---|
| 9,027,585 B2* | 5/2015 | Smirnov | F17D 1/16 |
| | | | 137/486 |
| 2010/0269924 A1* | 10/2010 | Yasuda | G05D 11/132 |
| | | | 137/488 |
| 2019/0033896 A1* | 1/2019 | Yasuda | G01F 15/005 |
| 2019/0278305 A1* | 9/2019 | Takijiri | G05D 7/0635 |
| 2020/0018413 A1* | 1/2020 | Dohi | F16K 37/0041 |
| 2020/0026311 A1* | 1/2020 | Nagai | G01F 1/363 |
| 2020/0033896 A1* | 1/2020 | Tseng | G05D 7/0647 |
| 2020/0232873 A1* | 7/2020 | Nagase | G05D 7/0635 |
| 2021/0239230 A1* | 8/2021 | Dohi | F16K 31/007 |
| 2021/0240208 A1* | 8/2021 | Hirata | G01F 15/005 |
| 2022/0043466 A1* | 2/2022 | Tokunaga | G05D 7/0623 |
| 2022/0082415 A1* | 3/2022 | Yuuki | G05D 7/0647 |
| 2022/0082416 A1* | 3/2022 | Horiguchi | F16J 15/06 |
| 2022/0163984 A1* | 5/2022 | Tokunaga | G01F 15/005 |
| 2022/0276664 A1* | 9/2022 | Price | F16K 31/007 |

* cited by examiner

FLOW RATE CONTROLLER, FLOW RATE CONTROL METHOD, AND PROGRAM RECORDING MEDIUM FOR FLOW RATE CONTROLLER

BACKGROUND

Technical Field

The present invention relates to a flow rate controller such as a mass flow controller used in a semiconductor manufacturing process, for example.

Related Art

Some flow rate controllers such as mass flow controllers include a plurality of control valves, and a degree of opening of each control valve is controlled by a different control rule, for example. For example, a flow rate controller described in JP 2004-280688 A includes a pressure control valve, a pressure sensor, a thermal-type flow rate sensor, and a flow rate control valve on a flow path in this order from the upstream side, and, in addition, includes a controller that controls degrees of opening of the pressure control valve and the flow rate control valve on the basis of outputs of the sensors. The controller controls the pressure control valve so that a pressure on the upstream side of a shunt resistor, which is a part of the thermal-type flow rate sensor, is kept at a predetermined constant pressure, and controls the flow rate control valve so that the deviation of a measured flow rate measured by the thermal flow rate sensor from a set flow rate is small.

By the way, as a result of intensive studies, the inventor of the present application has found the following fact. When each valve is controlled, as illustrated in FIG. 4, according to a control rule as described above by using a pressure-type flow rate sensor instead of the thermal-type flow rate sensor in the flow rate controller as described above, a control problem may occur in such a use that the set flow rate is changed as necessary from a small flow rate to a large flow rate.

Specifically, the pressure-type flow rate sensor includes a fluid resistor such as a laminar flow element, a first pressure sensor provided on the upstream side of the fluid resistor, and a second pressure sensor provided on the downstream side of the fluid resistor, and a resistor flow rate that is a flow rate of a fluid flowing through the fluid resistor is calculated on the basis of the difference between the values each obtained by squaring one of the measured pressures measured by the respective ones of the pressure sensors. A measurement accuracy of the resistor flow rate is higher when each pressure is kept at a low pressure than when the pressure is kept at a high pressure, in particular in the case of a small flow rate. Specifically, as illustrated in the graph of FIG. 5, even if a differential pressure measured by the pressure sensors and a noise amplitude superposed on the pressure sensors are the same, the noise amplitude superposed on the resistor flow rate is larger as a second measured pressure measured by the second pressure sensor is larger; therefore, the measurement accuracy of the resistor flow rate is improved by keeping the second measured pressure as low as possible.

However, in a case where the pressure control valve is controlled as the above-described conventional art in such a manner that the first measured pressure, which is the pressure on the upstream side of the fluid resistor, is kept constant at such a high pressure as a supply pressure or the like, when a small value is set as the set flow rate, the flow rate control valve is controlled such that the second measured pressure measured by the second pressure sensor also becomes close to a high pressure equivalent to the first measured pressure in order to reduce the differential pressure of the fluid resistor. As a result, in a case where a small flow rate is set as the set flow rate, a large noise amplitude appears in the resistor flow rate output from the pressure-type flow rate sensors, thereby resulting in a decrease in the accuracy of the flow rate control.

PRIOR ART DOCUMENT

Patent Document

JP 2004-280688 A

SUMMARY

The present invention has been made in view of the above-described problems, and an object of the present invention is to provide a flow rate controller capable of continuously keeping a pressure on the downstream side of a fluid resistor at such a low pressure that can ensure a flow rate accuracy regardless of a magnitude of a set flow rate, and capable of keeping the accuracy of the measured resistor flow rate high and thereby keeping the control accuracy of the flow rate high even when the set flow rate is small.

A flow rate controller according to the present invention includes: a fluid resistor provided in a flow path; a first valve provided on an upstream side of the fluid resistor; a second valve provided on a downstream side of the fluid resistor; a first pressure sensor provided between the first valve and the fluid resistor; a second pressure sensor provided between the fluid resistor and the second valve; a resistor flow rate calculator that calculates a resistor flow rate that is a flow rate of a fluid flowing through the fluid resistor, on a basis of a first measured pressure measured by the first pressure sensor and a second measured pressure measured by the second pressure sensor; a flow rate control unit that controls the second valve on a basis of a deviation of a control target flow rate from a set flow rate, the control target flow rate being the resistor flow rate or a valve flow rate that flows out of the second valve and is calculated from the resistor flow rate; a set pressure converter that outputs a first set pressure that is a target of a pressure on the upstream side of the fluid resistor, on a basis of the set flow rate and a second set pressure which is a target of a pressure on the downstream side of the fluid resistor and to which a constant value is set; and a pressure controller that controls the first valve on a basis of a deviation of the first measured pressure from the first set pressure output from the set pressure converter.

A flow rate control method according to the present invention uses a flow rate controller including a fluid resistor provided in a flow path, a first valve provided on an upstream side of the fluid resistor, a second valve provided on a downstream side of the fluid resistor, a first pressure sensor provided between the first valve and the fluid resistor, and a second pressure sensor provided between the fluid resistor and the second valve, and the method includes: a resistor flow rate calculation step of calculating a resistor flow rate that is a flow rate of a fluid flowing through the fluid resistor, on a basis of a first measured pressure measured by the first pressure sensor and a second measured pressure measured by the second pressure sensor; a flow rate control step of controlling the second valve on a basis of a deviation of a control target flow rate from a set flow rate, the control target flow rate being the resistor flow rate or a valve flow rate that flows out of the second valve and is calculated from the resistor flow rate; a set pressure converting step of outputting a first set pressure that is a target of a pressure on the upstream side of the fluid resistor, on a basis of the set flow rate and a second set pressure which is a target of a pressure on the downstream side of the fluid resistor and to which a constant value is set; and a pressure control step of controlling the first valve on a basis of a deviation of the first measured pressure from the first set pressure output in the set pressure converting step.

Such a flow rate controller and flow rate control method can achieve various set flow rates and, at the same time, can keep the pressure on the downstream side of the fluid resistor at a desired second set pressure or a pressure close the second set pressure by the following control operation, so that measurement accuracy of the resistor flow rate can be kept high from a large flow rate to a small flow rate, thereby achieving a high control accuracy of flow rate regardless of a set flow rate.

Specifically, the pressure on the upstream side of the fluid resistor is kept at the first set pressure by controlling the first valve, and the control target flow rate is kept at the set flow rate by the second valve. Here, the first set pressure is not a fixed value, but is a value that is changed in accordance with the set flow rate and the second set pressure that is a target of the pressure on the downstream side of the fluid resistor. The second set pressure is fixed at a constant value; therefore, when a target value of the set flow rate is large, the first set pressure is set to a large value so that the differential pressure before and after the fluid resistor will be large, and, to the contrary, when the target value of the set flow rate is small, the first set pressure is set to a small value. That is, in a conventional manner, the pressure of the upstream side is fixed, and the pressure on the downstream side of the fluid resistor is changed in accordance with the magnitude of the set flow rate; however, in the present invention, contrary to the conventional manner, the target of the pressure on the downstream side of the fluid resistor is fixed, and the target of the pressure on the upstream side can be changed in accordance with the magnitude of the set flow rate. Therefore, the first set pressure is set such that the pressure on the downstream side of the fluid resistor is a desired low pressure in accordance with various set flow rates, and the measurement accuracy of the resistor flow rate can be kept high even when the set flow rate is small.

The pressure on the downstream side of the fluid resistor can be kept at the second set pressure while the control target flow rate is kept at the set flow rate of various magnitudes; therefore, for example, by setting the second set pressure to a constant value of a low pressure, the resistor flow rate calculator can keep calculating the accurate resistor flow rate with influence of noise being reduced regardless of the magnitude of the set flow rate. Therefore, the flow rate controller of the present invention achieves a large flow rate to a small flow rate and can improve the control accuracy of the flow rate as compared with the conventional art even when flowing a small flow rate.

In order to cause the set pressure converter to output such an appropriate first set pressure that the pressure on the downstream side of the fluid resistor will be equal to the second set pressure, the set pressure converter only has to be configured to output, as the first set pressure, the pressure on the upstream side of the fluid resistor that is necessary for the resistor flow rate to be equal to the set flow rate when the pressure on the downstream side of the fluid resistor is kept at the second set pressure.

Here, the first set pressure is a pressure that is necessary for the resistor flow rate to be equal to the set flow rate when the pressure on the downstream side of the fluid resistor is kept at the second set pressure; therefore, when the control target flow rate is controlled to the set flow rate by the second valve, the pressure on the downstream side of the fluid resistor is kept at the second set pressure or a pressure close to the second set pressure. Therefore, the pressure on the downstream side of the fluid resistor is kept at the second set pressure as a result of a control operation of the first valve and the second valve keeps. Further, since the set pressure converter changes the first set pressure in accordance with the magnitude of the value of the set flow rate, the pressure on the downstream side of the fluid resistor is maintained at the second set pressure regardless of the magnitude of the value of the set flow rate. Therefore, even when the set flow rate is small, the pressure on the downstream side of the fluid resistor is kept at a low pressure, so that the measurement accuracy of the resistor flow rate is kept high, and the control accuracy of the flow rate can be made higher than before.

In order to makes it possible to set various second setting pressures so that high accuracy of the resistor flow rate calculated by the resistor flow rate calculator can be kept while satisfying the requirement that the pressure on the downstream side of the flow rate controller can be kept at various pressures, the second set pressure is only required to be variable.

In order to keep the pressure on the downstream side of the fluid resistor low and, at the same time, to keep the accuracy of the calculated resistor flow rate high even when the flow rate controller achieves a large flow rate, it is only necessary that the set pressure converter is configured such that a larger value is set as the first set pressure as the set flow rate has a larger value.

For example, in order to make it possible to measure the flow rate with high accuracy and to have high responsiveness in an environment where the pressure is kept low as in a semiconductor manufacturing process, the resistor flow rate calculator only has to calculate the resistor flow rate on the basis of the difference between a power of the first measured pressure and a power of the second measured pressure.

Examples of a more specific configuration for calculating the resistor flow rate include a resistor flow rate calculator that calculates the resistor flow rate by multiplying, by a flow rate constant, the difference between a square of the first measured pressure and a square of the second measured pressure. With such a configuration, regardless of the magnitude of the set flow rate according to the present invention, the effect of improving the flow rate accuracy is made more remarkable by the function of being capable of continuously keeping the pressure on the downstream side of the fluid resistor at a low pressure.

For example, in order to prevent an inappropriate value as the second set pressure from being set and the pressure on the downstream side of the fluid resistor from becoming a high pressure and in order to keep the accuracy of the resistor flow rate high, the set pressure converter only has to be configured to receive, as the second set pressure, a constant value 0 Torr or more and 900 Torr or less.

For example, in an example of a specific aspect for reducing the number of data points required for a calibration work of the resistor flow rate and for providing the resistor flow rate with high accuracy within a practical range, the set pressure converter is configured to receive, as the second set pressure, a constant value 0 Torr or more and 400 Torr or less.

In order to further improve the responsiveness of the flow rate control by controlling the valve flow rate itself flowing out of the second valve, which is a closest part to a supply target, in the flow rate controller, it is only necessary to further include a valve flow rate calculator that calculates the valve flow rate flowing out of the second valve, on a basis of the resistor flow rate and the second measured pressure, wherein the control target flow rate is the valve flow rate, and the flow rate control unit is configured to control the second valve on a basis of a deviation of the valve flow rate from the set flow rate.

In order to reduce a load on a memory amount, a calculation amount, and the like necessary for the set pressure converter to output the first set pressure on the basis of the set flow rate and the second set pressure and in order to output the first set pressure at a high speed even in a mass flow controller or the like having limited calculation capability and the like, the flow rate controller only has to be configured as follows. The flow rate controller includes a table in which the first set pressure is associated with each set of the second set pressure and the set flow rate, wherein the set pressure converter is configured to refer to the table to output the first set pressure on a basis of the second set pressure and the set flow rate that are received. With such a configuration, for example, even if the set flow rate changes in time series, the first set pressure can be immediately changed to the pressure corresponding to the target value at each moment. Therefore, the pressure on the downstream side of the fluid resistor can be continuously kept at the second set pressure while achieving the set flow rate even in the transient state, for example.

For example, in order to reduce noise superposed on the resistor flow rate to substantially zero in a state where the second valve is fully closed and a fluid is not flowing so that a user can hardly misunderstand that an outflow from the second valve is occurring and, at the same time, a sensor shift or the like occurring in the resistor flow rate is visible, the resistor flow rate calculator only has to be configured to calculate: when the second valve is opened, the resistor flow rate on the basis of the first measured pressure and the second measured pressure; and when the second valve is fully closed, the resistor flow rate on the basis of the first measured pressure and the second set pressure.

In order to enjoy substantially the same effect as that of the flow rate controller according to the present invention by, for example, updating a program in an existing flow rate controller, it is only required to use a program for a flow rate controller including a fluid resistor provided in a flow path, a first valve provided on an upstream side of the fluid resistor, a second valve provided on a downstream side of the fluid resistor, a first pressure sensor provided between the first valve and the fluid resistor, and a second pressure sensor provided between the fluid resistor and the second valve, and that makes a computer function as: a resistor flow rate calculator that calculates a resistor flow rate that is a flow rate of a fluid flowing through the fluid resistor, on the basis of a first measured pressure measured by the first pressure sensor and a second measured pressure measured by the second pressure sensor; a flow rate control unit that controls the second valve on the basis of a deviation of a control target flow rate from a set flow rate, the control target flow rate being the resistor flow rate or a valve flow rate that flows out of the second valve and is calculated from the resistor flow rate; a set pressure converter that outputs a first set pressure that is a target of a pressure on the upstream side of the fluid resistor, on the basis of the set flow rate and a second set pressure which is a target of a pressure on the downstream side of the fluid resistor and to which a constant value is set; and a pressure controller that controls the first valve on the basis of a deviation of the first measured pressure from the first set pressure output from the set pressure converter.

The program for a flow rate controller may be distributed electronically or may be recorded in a program recording medium such as a compact disc (CD), a digital versatile disc (DVD), or a flash memory.

As described above, with the flow rate controller according to the present invention, the first valve on the upstream side achieves the first set pressure set in accordance with the second set pressure and the set flow rate, and the second valve on the downstream side achieves control of adjusting the control target flow rate to the set flow rate, so that, as a result, the pressure on the downstream side of the fluid resistor can be continuously kept at the second set pressure or a pressure close to the second set pressure. Therefore, it is possible to keep the pressure on the downstream side of the fluid resistor at a low pressure regardless of the magnitude of the set flow rate, so that it is possible to reduce noise superposed on the calculated resistor flow rate and thereby to keep the accuracy high.

DETAILED DESCRIPTION

A flow rate controller 100 according to a first embodiment of the present invention will be described with reference to FIGS. 1 and 2.

The flow rate controller 100 of the first embodiment is used, for example, in various semiconductor manufacturing processes to supply a fluid into a chamber at a predetermined set flow rate. Examples of the fluid can include a pure gas, a gas in which a plurality of types of gases are mixed, a gas-liquid mixture, a liquid, and the like. Hereinafter, a description will be given taking, as an example, a case where the fluid is a gas.

Figure 1:
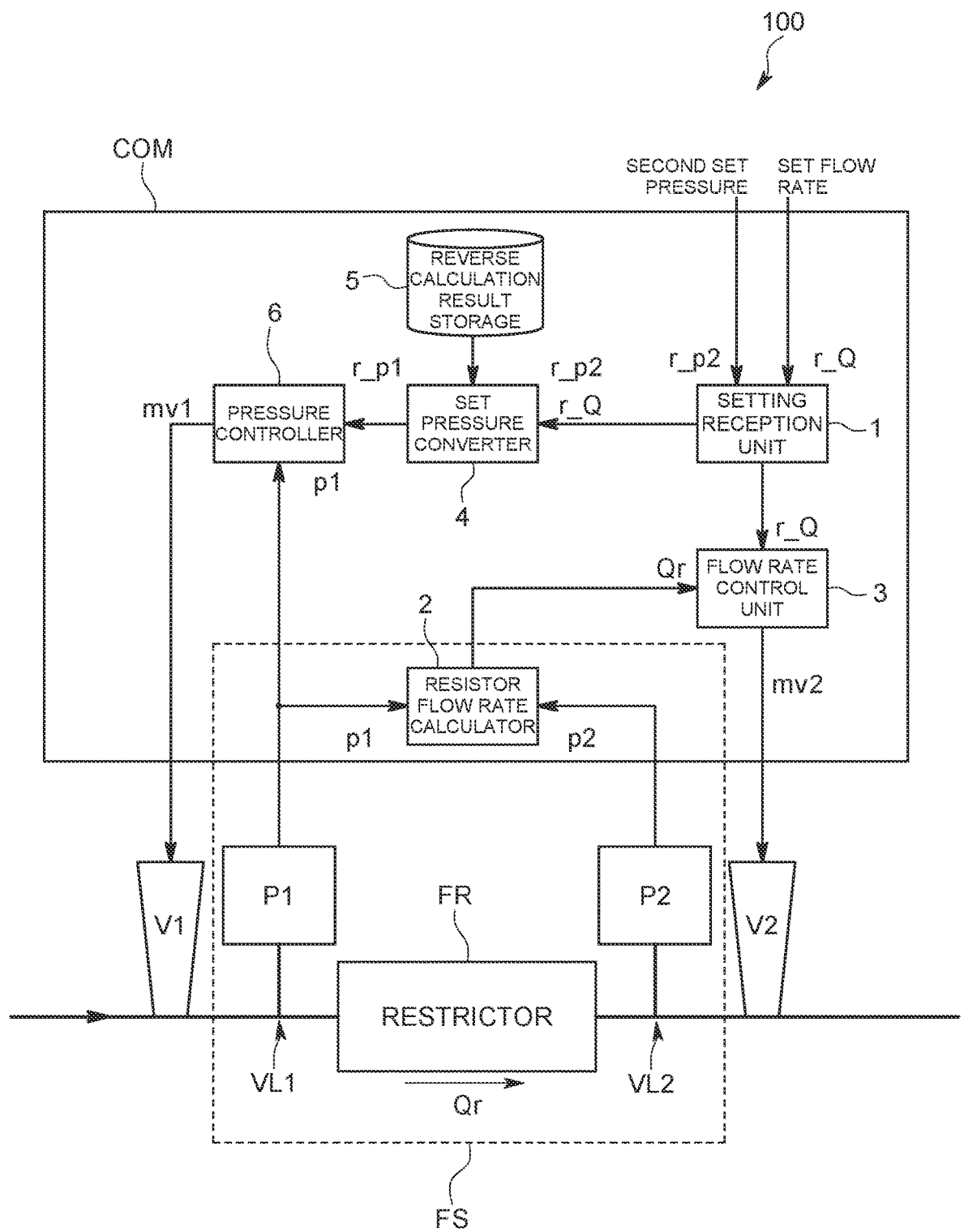
FIG. 1 is a schematic diagram illustrating a flow rate controller according to a first embodiment of the present invention.
Figure 2:
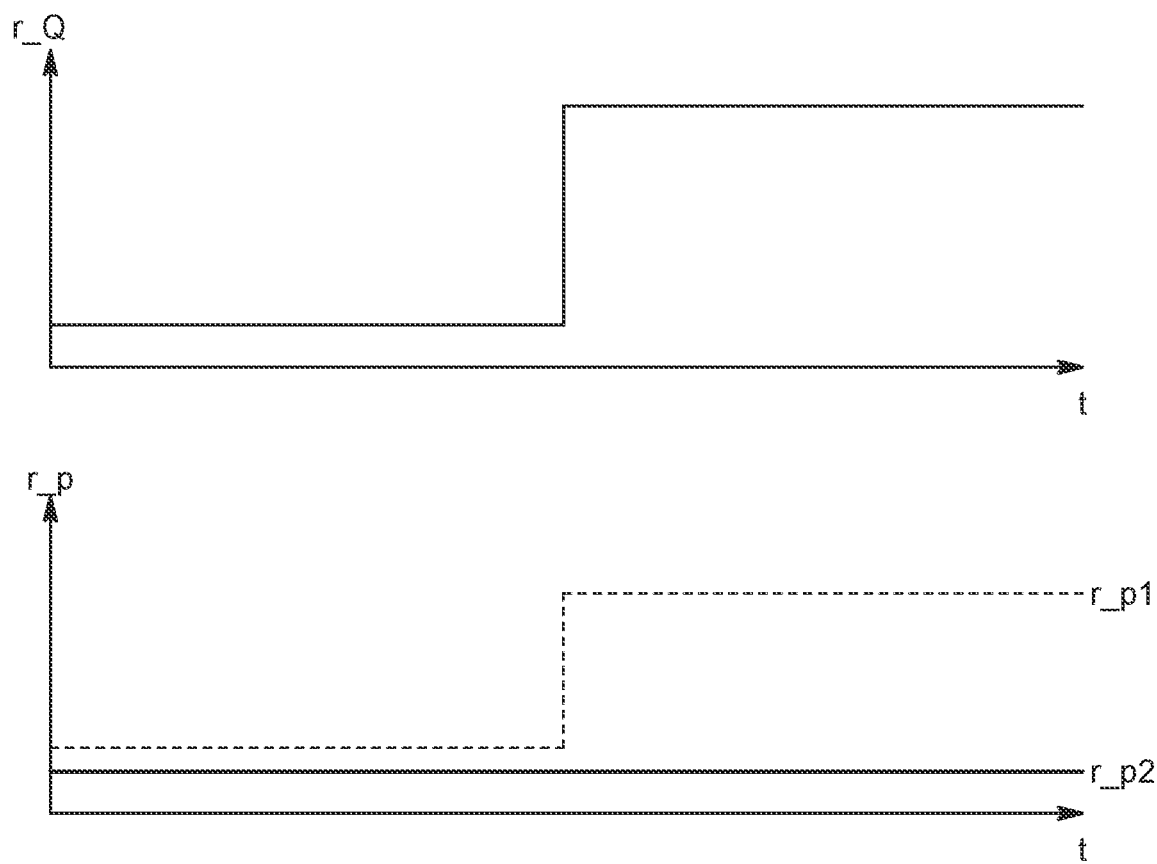
FIG. 2 is a graph showing a relationship among a set flow rate, a second set pressure, and a first set pressure in the first embodiment.

As illustrated in FIG. 1, the flow rate controller 100 includes: a fluid device including a sensor and a valve provided in a flow path; and a control operation mechanism COM that controls the fluid device.

The fluid device includes a first valve V1, a first pressure sensor P1, a fluid resistor FR, a second pressure sensor P2, and a second valve V2 provided in the flow path. The devices are provided in this order from the upstream side.

Here, the fluid resistor FR is a laminar flow element, and a flow rate of a gas flowing in the fluid resistor FR is generated according to a differential pressure before and after the fluid resistor FR. The first pressure sensor P1, the fluid resistor FR, the second pressure sensor P2, and the resistor flow rate calculator 2 to be described later constitute a flow rate sensor FS that measures a flow rate of a fluid flowing through the flow path between the first valve V1 and the second valve V2. In the following description, the flow rate of the fluid flowing through the fluid resistor FR is also referred to as Qr.

That is, the first pressure sensor P1, the fluid resistor FR, and the second pressure sensor P2 constitute a sensing mechanism that outputs output signals in accordance with the flow rate of the fluid flowing through the flow path, and the resistor flow rate calculator 2 calculates the flow rate of the fluid flowing through the flow path on the basis of the output signals of the sensing mechanism. Since the flow rate sensor FS is a so-called pressure-type flow rate sensor and has a characteristic that the measurement accuracy of the measured flow rate is higher as the pressures measured by the pressure sensors are lower. In the present embodiment, a flow path provided with the flow rate controller 100 is connected to a chamber in a low vacuum state in which a chemical vapor deposition (CVD) process or the like is performed. Therefore, the downstream side of the fluid resistor FR is also in an environment in which a low vacuum state can be kept depending on a control result.

The first pressure sensor P1 measures the pressure of the gas in the first volume VL1 that is the volume between the first valve V1 and the fluid resistor FR in the flow path (hereinafter, the pressure is also referred to as a first measured pressure p1).

The second pressure sensor P2 measures the pressure of the gas in the second volume VL2 that is the volume between the second valve V2 and the fluid resistor FR in the flow path (hereinafter, the pressure is also referred to as a second measured pressure p2).

As described above, the first pressure sensor P1 and the second pressure sensor P2 respectively measure the pressures of the first volume VL1 and the second volume VL2, which are the two volumes formed by the first valve V1, the fluid resistor FR, and the second valve V2. In other words, the first pressure sensor P1 and the second pressure sensor P2 respectively measure the pressure on the upstream side and the pressure on the downstream side of the fluid resistor FR.

The first valve V1 and the second valve V2 are of the same type in the present embodiment, and are each, for example, a piezo valve in which a valve body is driven with respect to a valve seat by a piezo element. In the present embodiment, a degree of opening of the second valve V2 is controlled by flow rate feedback control on the basis of a deviation of the resistor flow rate Qr measured by the flow rate sensor FS from a set flow rate r_Q set by a user. On the other hand, a degree of opening of the first valve V1 is controlled by pressure feedback control on the basis of a deviation of the first measured pressure p1 measured by the first pressure sensor P1 from the first set pressure r_p1, where the first set pressure r_p1 is a target pressure of the first volume VL1 converted from a second set pressure r_p2 that is a target pressure of the second volume VL2 set by the user.

Here, the pressure feedback control based on the deviation of the second measured pressure p2 measured by the second pressure sensor P2 from the second set pressure r_p2 set by the user is not performed by any of the valves V1 and V2. However, as will be described later, the first valve V1 is pressure-controlled so that the pressure in the first volume VL1 will be equal to the first set pressure r_p1, and the second valve V2 is flow-rate-controlled so that the resistor flow rate Qr will be equal to the set flow rate r_Q, whereby the pressure in the second volume VL2 is finally kept at the second set pressure r_p2 or a pressure close to the second set pressure r_p2.

Next, the control operation mechanism COM will be described in detail. The control operation mechanism COM is a so-called computer including, for example, a (central processing unit) CPU, a memory, an A/D converter, a D/A converter, an input and output unit, and the like, and when a program for a flow rate controller stored in the memory is executed to cause various devices to cooperate with each other, the control operation mechanism COM at least exhibits functions as a setting reception unit 1, the resistor flow rate calculator 2, a flow rate control unit 3, a set pressure converter 4, a reverse calculation result storage 5, and a pressure controller 6.

The setting reception unit 1 receives the set flow rate r_Q and the second set pressure r_p2, which are control commands to the flow rate controller 100, from a user, and at the same time, outputs both the set flow rate r_Q and the second set pressure r_p2 to the set pressure converter 4 to be described later, and outputs only the set flow rate r_Q to the flow rate control unit 3. Here, the set flow rate r_Q is a parameter directly used in a feedback loop. To the set flow rate r_Q, the following flow rate is set: a flow rate that the user wants to flow through the flow path; or a flow rate of a fluid that the user wants to supply to a subsequent chamber. To the set flow rate r_Q, a value of a targeted flow rate is set as a time function, and the user can set any value of 0% to 100% for each time. For example, as illustrated in the graph of FIG. 2, the set flow rate is defined as a step function r_Q(t) having time t as a parameter. The set flow rate r_Q can be defined as a ramp function or another time function in addition to the step function. On the other hand, as the second set pressure r_p2, a value set by the user as a pressure in the second volume VL2 on the downstream side of the fluid resistor FR is set as a constant value. In other words, the second set pressure is not received in the form of a step function, a ramp function, or the like, and only a target pressure value that is continuously constant regardless of time is set. More specifically, with respect to the second set pressure r_p2, a predetermined low pressure value at which the flow rate sensor FS exhibits sufficient flow rate accuracy is set as a target value.

The resistor flow rate calculator 2 calculates the flow rate on the basis of measurement values represented by the output signals of the first pressure sensor P1 and the second pressure sensor P2 and a flow rate characteristic value corresponding to the measurement values. Specifically, the resistor flow rate calculator 2 calculates the resistor flow rate Qr, which is the flow rate of the fluid flowing in the fluid resistor FR, on the basis of the following pressures: the first measured pressure p1, which is the pressure on the upstream side of the fluid resistor FR; and the second measured pressure p2, which is the pressure on the downstream side of the fluid resistor FR. Here, the resistor flow rate calculator 2 calculates the flow rate on the basis of not only the first measured pressure p1 and the second measured pressure p2 but also a flow rate constant k determined according to the characteristic of the fluid resistor FR. Specifically, a value is calculated as the resistor flow rate Qr by multiplying the difference between the square of the first measured pressure p1 and the square of the second measured pressure p2 by the flow rate constant k. That is, a flow rate calculation formula used in the resistor flow rate calculator 2 is $Qr=k(p1^2-p2^2)$ . . . Equation 1.

In addition, the resistor flow rate calculator 2 is configured to switch methods of calculating the resistor flow rate Qr, depending on whether a fluid is flowing through the flow path. For example, when the second valve V2 disposed on the downstream side is opened at an arbitrary degree of opening, the resistor flow rate Qr is calculated by substituting the actually measured first measured pressure p1 and second measured pressure p2 into the flow rate calculation formula of Equation 1. On the other hand, when the second valve V2 is fully closed, the resistor flow rate calculator 2 calculates the resistor flow rate Qr using the second set pressure r_p2 received by the setting reception unit 1 and a differential pressure Δp between the first measured pressure p1 and the second measured pressure p2. Specifically, the resistor flow rate calculator 2 calculates the flow rate by Qr=k(Δp^2+2×r_p2×Δp) Equation 2. Equation 2 is obtained by eliminating p1 from Equation 1 on the basis of the relationship of Δp=p1−p2.

In Equation 2, since Δp is a differential pressure, noise superposed on each of the first measured pressure p1 and the second measured pressure p2 substantially cancels each other, and since the set second pressure r_p2 is a constant value, noise is greatly reduced in the calculated resistor flow rate Qr. Therefore, the resistor flow rate Qr output from the resistor flow rate calculator 2 when the second valve V2 is fully closed ideally shows almost zero or only an extremely small fluctuation. Therefore, when such a resistor flow rate Qr is externally displayed when the second valve V2 is fully closed, the user can easily trust that the fluid is not flowing to the downstream side from the flow rate controller 100.

In addition, if there is an occurrence of an outflow from the valve V2 on the downstream side, since the differential pressure Δp is an actually measured value, a change from zero to a predetermined value appears in the resistor flow rate Qr, and it can also be found that the outflow is occurring. In other words, in a case where it is displayed that the resistor flow rate Qr is zero when the second valve V2 is fully closed regardless of the output of the flow rate sensor FS, even if outflow occurs, the user cannot find the occurrence. In contrast, in the case of the flow rate controller 100 of the first embodiment, since only a slight fluctuation appears in the resistor flow rate Qr with respect to 0 as a reference, the user hardly misunderstands that there is an outflow even though the outflow is actually not generated; and when the outflow is actually occurring, the user can find the occurrence.

In addition, if there is occurring a zero-point shift or the like in the flow rate sensor FS, a shift amount of the zero-point shift also appears in the resistor flow rate Qr accurately calculated by Equation 2. Specifically, when the zero point of any one of the pressure sensors is shifted due to temperature drift or the like, only the shift amount in which noises superposed on the measured pressures are substantially cancelled appears in the differential pressure Δp, which is the actually measured value in Equation 2. Therefore, if it is definite that there is no outflow when the second valve V2 is fully closed, the flow rate value output as the resistor flow rate Qr when the second valve V2 is fully closed represents itself the shift amount from the zero point. In other words, if zero is output regardless of the output of the flow rate sensor FS when the second valve V2 is fully closed, the user cannot find, in the first place, that there is a zero-point shift in the resistor flow rate Qr. Furthermore, Equation 1 includes an operation of squaring each measured pressure, and the noises are thereby enlarged; therefore, even though the difference is calculated between the squares, the noise is not sufficiently reduced. Therefore, it is difficult to extract only the shift amount. As a result, it is easy to quantitatively evaluate the zero-point shift in the resistor flow rate Qr on the basis of Equation 2.

The flow rate control unit 3 performs flow rate feedback control on an applied voltage that is a manipulation amount mv2 input to the second valve V2 by, for example, (proportional-integral-derivative) PID control so as to reduce a deviation of the resistor flow rate Qr being measured by the flow rate sensor FS with respect to the set flow rate r_p2 being received by the setting reception unit 1. That is, the flow rate sensor FS, the flow rate control unit 3, and the second valve V2 form an independent feedback loop for controlling the flow rate. In the present embodiment, the resistor flow rate Qr is the control target flow rate, but a flow rate flowing at another place in the flow path of the flow rate controller 100 may be fed back as the control target flow rate.

The set pressure converter 4 is configured to output, on the basis of the second set pressure r_p2 and the set flow rate r_Q, as the first set pressure r_p1, the pressure on the upstream side of the fluid resistor FR necessary for the resistor flow rate Qr to be the set flow rate r_Q when the pressure on the downstream side of the fluid resistor FR is kept at the second set pressure r_p2. Since the relationship between the pressures before and after the fluid resistor FR and the resistor flow rate Qr is defined by the flow rate calculation formula of Equation 1 described above, the first set pressure r_p1 can be obtained by performing reverse calculation on the first measured pressure p1 by substituting the second set pressure r_p2 in place of the second measured pressure p2 and substituting the set flow rate r_Q in place of the resistor flow rate Qr in Equation 1. In the present embodiment, for the purpose of reducing a memory load or the like on the control operation mechanism COM, a plurality of sets of the second set pressure r_p2 and the set flow rate r_Q are used to calculate in advance their respective first set pressures r_p1 by reverse calculation of Equation 1, and a table related to the second set pressure r_p2, the set flow rate r_Q, and the first set pressure r_p1 is created and stored in the reverse calculation result storage 5. The set pressure converter 4 refers to the table on the basis of the second set pressure r_p2 and the set flow rate r_Q set by the user, and outputs the corresponding first set pressure r_p1 to the pressure controller 6.

Here, the relationship among the first set pressure r_p1, the second set pressure r_p2, and the set flow rate r_Q will be qualitatively described. As illustrated in the graph of FIG. 2, it is assumed that the set flow rate r_Q is defined by a step function that changes over time from a small flow rate to a large flow rate and that the second set pressure r_p2 is set constantly to a constant value of a predetermined low pressure. In this case, in a period when the set flow rate r_Q is set to a small flow rate, a value slightly larger than the second set pressure r_p2 is set as the first set pressure r_p1, which means that a small differential pressure Δp necessary for achieving the small flow rate is set. In contrast, in a period when the set flow rate r_Q is set to a large flow rate, the first set pressure r_p1 is set to a value significantly larger than the second set pressure r_p2. That is, since the second set pressure r_p2 is kept constant at a low pressure, the differential pressure Δp between before and after the fluid resistor FR required to generate a flow rate is adjusted by the magnitude of the first set pressure r_p1. In addition, as the set flow rate r_Q increases, the first set pressure r_p1 is also set to a larger value, which means that these target values have a positive correlation.

The pressure controller 6 controls an applied voltage that is a manipulation amount mv1 input to the first valve V1, on the basis of the deviation of the first measured pressure p1 measured by the first pressure sensor P1 with respect to the first set pressure r_p1 output from the set pressure converter 4. That is, one feedback loop is formed by the pressure controller 6, the first pressure sensor P1, and the first valve V1. The pressure controller 6 controls the degree of opening of the first valve V1, so that the pressure in the first volume VL1 is kept constant at the first set pressure r_p1 output from the set pressure converter 4.

Next, a description will be given to a point that the control of the first valve V1 and the second valve V2 keeps the pressure in the second volume VL2 on the downstream side of the fluid resistor FR at the second set pressure of a constant value set by the user.

Neither the first valve V1 nor the second valve V2 does not feedback-control directly the second measured pressure p2 itself, which is the pressure of the second volume VL2. Specifically, the first measured pressure p1, which is the pressure in the first volume VL1, is controlled to the first set pressure r_p1 by the first valve V1, and the resistor flow rate Qr flowing through the fluid resistor FR is controlled to the set flow rate r_Q by the second valve V2. Here, the first set pressure r_p1, the set flow rate r_Q, and the second set pressure r_p2 are set to satisfy Equation 1; therefore, when the first measured pressure p1 is the first set pressure r_p1 and the resistor flow rate Qr is the set flow rate r_Q, the second measured pressure p2 is obviously the second set pressure r_p2.

As described above, the flow rate controller 100 of the first embodiment can enables the following operation. The set pressure converter 4 converts the set flow rate r_Q, which is the flow rate desired to be flowed, and the second set pressure r_p2, which is the pressure desired to be kept on the downstream side of the pressure-type flow rate sensor FS, into the first set pressure r_p1, which is the pressure on the upstream side of the flow rate sensor FS and can simultaneously satisfy both the set flow rate r_Q and the second set pressure r_p2; and the first valve V1 is controlled so that the pressure of the first volume VL1 is kept at the first set pressure r_p1.

Therefore, while the second valve V2 is controlled such that the resistor flow rate Qr is achieved to be the set flow rate r_Q, the first valve V1 can be controlled such that the pressure of the second volume VL2 is kept at the second set pressure r_p2 regardless of the magnitude of the set flow rate r_Q.

Therefore, while causing a desired flow rate to flow, the pressure on the downstream side of the fluid resistor FR can be continuously kept in a low pressure range in which the pressure-type flow rate sensor FS can exert sufficient flow rate accuracy; therefore, it is possible to prevent noise from largely affecting on the output of the flow rate sensor FS regardless of the flow rate, and the flow rate control accuracy can be made higher than before.

Figure 3:
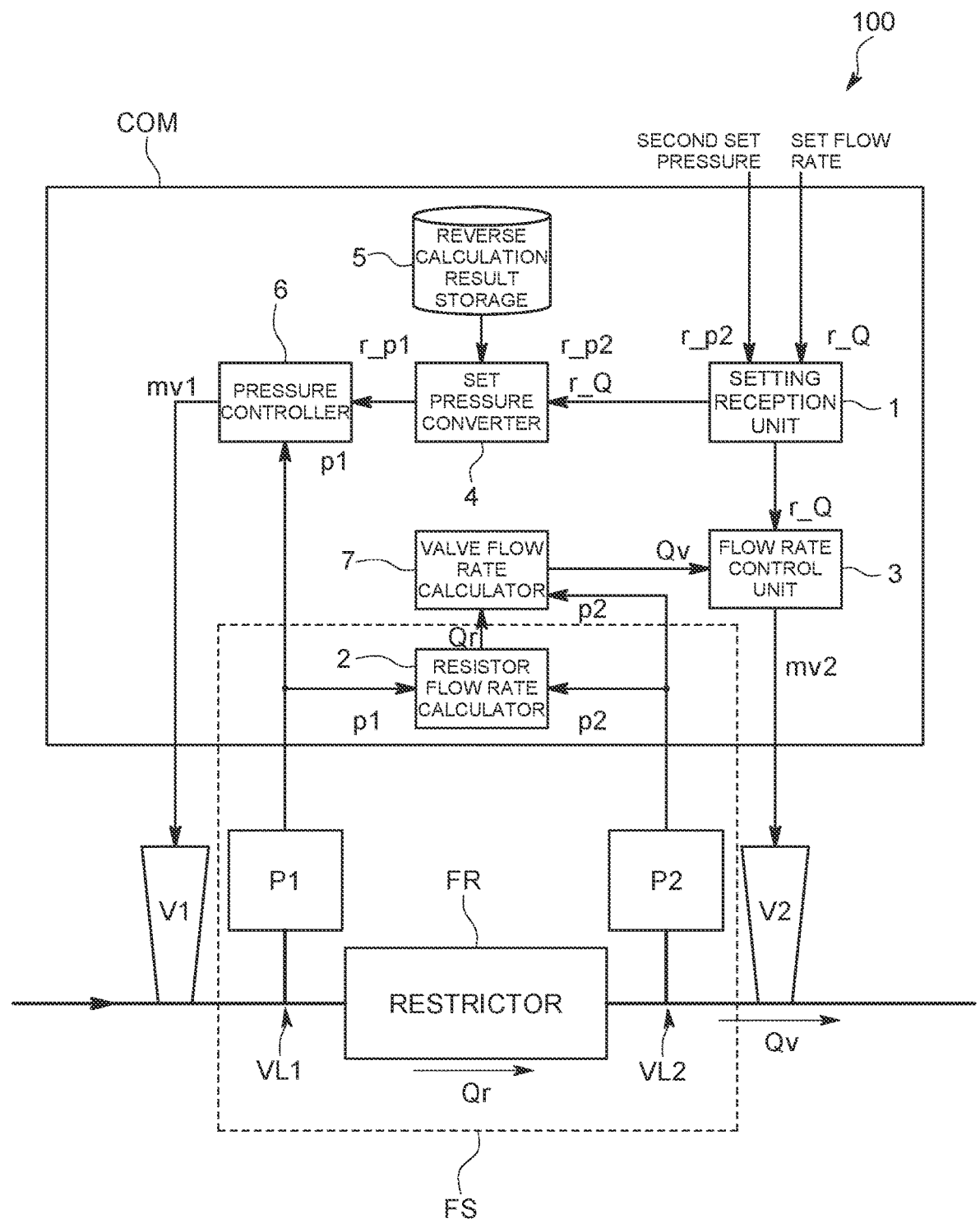
FIG. 3 is a schematic diagram illustrating a flow rate controller according to a second embodiment of the present invention.
Figure 4:
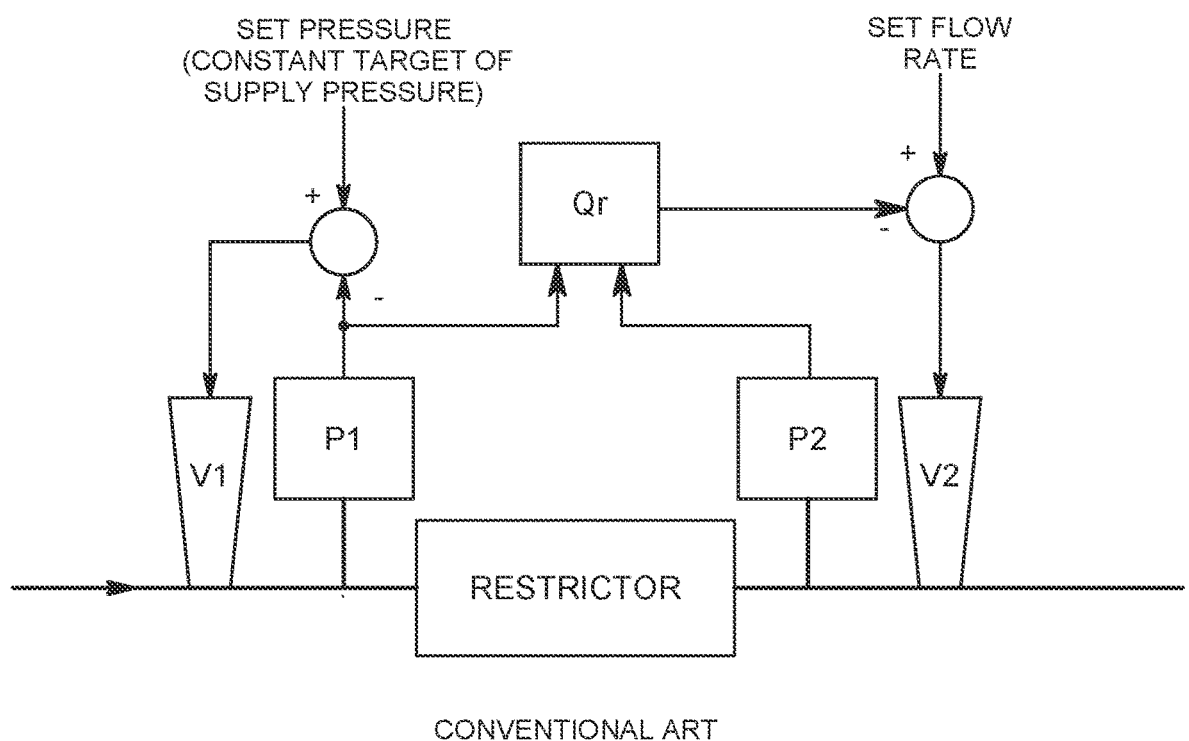
FIG. 4 is a schematic diagram illustrating a control configuration of a conventional flow rate controller.
Figure 5:
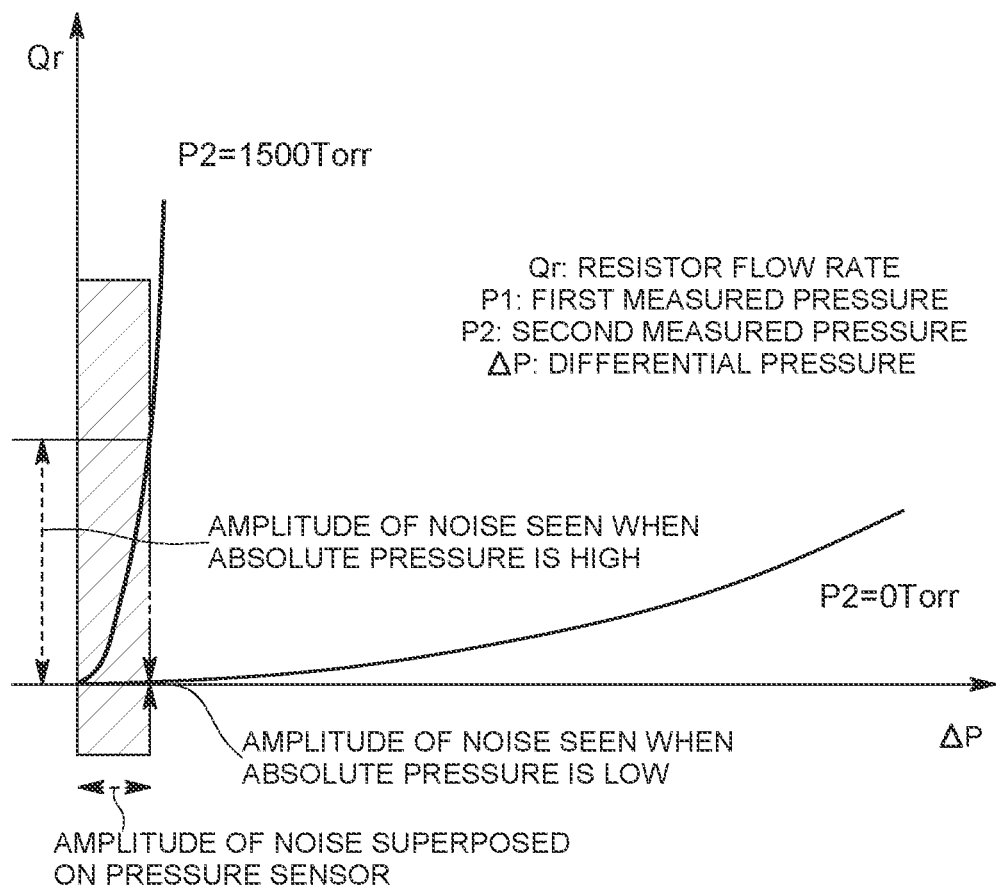
FIG. 5 is a graph showing a relationship between an absolute pressure and a noise amplitude in a pressure-type flow rate sensor.

Next, a flow rate controller 100 of a second embodiment of the present invention will be described with reference to FIG. 3. The same components as those described in the first embodiment are denoted by the same reference signs.

The flow rate controller 100 of the second embodiment is different from the flow rate controller 100 of the first embodiment in the following points. The flow rate controller 100 of the second embodiment further includes a valve flow rate calculator 7 that calculates, on the basis of the resistor flow rate Qr, a valve flow rate Qv that is a flow rate flowing out of the second valve V2. The flow rate control unit 3 uses the valve flow rate Qv as the control target flow rate and controls the second valve V2 on the basis of a deviation of the valve flow rate Qv from the set flow rate r_Q.

The valve flow rate calculator 7 calculates the valve flow rate Qv by subtracting, from the resistor flow rate Qr calculated by the resistor flow rate calculator 2, a value obtained by multiplying a time derivative value of the second measured pressure p2 by a predetermined coefficient α. That is, the valve flow rate calculator 7 calculates the valve flow rate Qv based on $Qv=Qr-\alpha d/dt(p2)$ . . . Equation 3, where $d/dt$ is a time derivative operator. It is possible to derive the fact that the valve flow rate Qv can be calculated by the above calculation, from the present applicant's detailed description in another application, in which the applicant of the present application describes that a gas state equation is applied to the second volume VL2 on the basis of the followings: a change in mass (change in molar amount) due to an outflow and inflow of a fluid out of and into the second volume VL2; a temperature of the fluid, the second measured pressure p2, and a gas constant R. In addition, such a relationship can be established for a fluid if a gas state equation can be applied to the fluid; therefore, an application target fluid is a gas, a gas-liquid mixture, or the like, and only a pure liquid is excluded from the application target.

In the flow rate controller 100 of the second embodiment configured as described above, the flow rate control unit 3 can control the second valve V2 in such a manner that the valve flow rate Qv actually flowing through the second valve V2 coincides with the set flow rate r_Q, so that it is possible to perform control while making a control point and a measurement point coincide with each other. Therefore, it is possible to solve the following problem. In the case of using the resistor flow rate Qr, there occurs a delay in the measured flow rate in a transient state because the control point and the measurement point are deviated from each other, and as a result, there occurs a delay also in the flow rate control. In addition, even when the valve flow rate Qv is used as the control target flow rate as described above, the second measured pressure p2, which is the pressure on the downstream side of the fluid resistor FR, can be continuously kept at a value close to the second set pressure r_p2. That is, the delay in control can be eliminated, and, at the same time, the flow rate accuracy of the resistor flow rate Qr can be kept high as in the first embodiment, whereby, as a result, the flow rate accuracy of the valve flow rate Qv can also be improved.

Other embodiments will be described.

For example, the setting reception unit may be configured to receive, as the second set pressure r_p2, only a constant value within a recommended working pressure range for the flow rate sensor FS. For example, the setting reception unit may be configured to receive a constant value of 0 Torr or more and 900 Torr or less as the second set pressure, or may be more preferably configured to receive a constant value of 0 Torr or more and 400 Torr or less. The pressure range that can be received may be limited as necessary in accordance with pressures necessary for a chamber to which a fluid is supplied and to a pressure range in which the flow rate sensor can guarantee a flow rate accuracy.

The second set pressure may be fixed so that a user cannot change the setting. Alternatively, the second set pressure may be most appropriately set, for example, at the time of factory shipment so that the flow rate accuracy of the flow rate sensor will be exerted, and the second set pressure can be changed only by an authorized operator.

The flow rate calculation formula used in the resistor flow rate calculator is not limited to Equation 1 or the like. For example, instead of calculating the resistor flow rate on the basis of the difference between the values obtained by squaring respective ones of the pressures, the resistor flow rate may be calculated on the basis of the difference between a power of the first measured pressure and a power of the second measured pressure. The exponent of the powers is not limited to a natural number, and may be a decimal number or the like.

The set pressure converter outputs the first set pressure by referring to the table in order to reduce the load on the memory and the like. However, if sufficient computer resources can be used, the first set pressure may be calculated as necessary by performing the reverse calculation of Equation 1 every time the set flow rate and the second set pressure are received. In this case, the reverse calculation result storage may be omitted. In addition, if the table has no corresponding set of data including the set flow rate, the second set pressure, and the first set pressure, the first set pressure corresponding to the table may be newly calculated by a method such as linear interpolation of the existing sets of data.

The configuration in which the set pressure converter calculates the first set pressure on the basis of the second set pressure and the set flow rate is not limited to the configuration in which the calculation formula of the resistor flow rate of Equation 1 is strictly reverse calculated. For example, under the assumption that the differential pressure $\Delta p$ is sufficiently small, the first set pressure $r\_p1$ may be approximately calculated while ignoring the square term of the differential pressure $\Delta p$ in Equation 2. Specifically, Equation 2 is approximated as $Qr=k(2\times r\_p2\times(r\_p1-r\_p2))$, and the first set pressure $r\_p2$ may be calculated by $r\_p1=r\_p2+Qr/(2k\times r\_p2)$. The set pressure converter may calculate the first set pressure on the basis of the second set pressure and the set flow rate.

The fluid resistor is not limited to the laminar flow element, and for example, a flow rate restriction element such an orifice may be used. The first valve and the second valve are not limited to the piezo valve, and may be control valves such as solenoid valves that each include an actuator of various driving principles and can achieves an arbitrary degree of opening.

Although the mass flow controller of each embodiment has been described taking as an example a mass flow controller in which respective ones of the components are packaged, the flow rate controller may be configured by separately combining valves, pressure sensors, and a fluid resistor.

In addition, various modifications of the embodiments, combinations of some of the embodiments, and the like may be made without departing from the gist of the present invention.

DESCRIPTION OF REFERENCE CHARACTERS

100 flow rate controller
V1 first valve
V2 second valve
FS flow rate sensor
FR fluid resistor
P1 first pressure sensor
P2 second pressure sensor
1 setting reception unit
2 resistor flow rate calculator
3 flow rate control unit
4 set pressure converter
5 reverse calculation result storage
6 pressure controller

What is claimed is:

1. A flow rate controller comprising:
   a fluid resistor provided in a flow path;
   a first valve provided on an upstream side of the fluid resistor;
   a second valve provided on a downstream side of the fluid resistor;
   a first pressure sensor provided between the first valve and the fluid resistor;
   a second pressure sensor provided between the fluid resistor and the second valve;
   a resistor flow rate calculator that calculates a resistor flow rate that is a flow rate of a fluid flowing through the fluid resistor, on a basis of a first measured pressure measured by the first pressure sensor and a second measured pressure measured by the second pressure sensor;
   a flow rate control unit that controls the second valve on a basis of a deviation of a control target flow rate from a set flow rate, the control target flow rate being the resistor flow rate or a valve flow rate that flows out of the second valve and is calculated from the resistor flow rate;
   a set pressure converter that outputs a first set pressure that is a target of a pressure on the upstream side of the fluid resistor, on a basis of the set flow rate and a second set pressure which is a target of a pressure on the downstream side of the fluid resistor and to which a constant value is set; and
   a pressure controller that controls the first valve on a basis of a deviation of the first measured pressure from the first set pressure output from the set pressure converter.

2. The flow rate controller according to claim 1, wherein the set pressure converter outputs, as the first set pressure, the pressure on the upstream side of the fluid resistor that is necessary for the resistor flow rate to be equal to the set flow rate when the pressure on the downstream side of the fluid resistor is kept at the second set pressure.

3. The flow rate controller according to claim 1, wherein the second set pressure is variable.

4. The flow rate controller according to claim 1, wherein the set pressure converter is configured to output a larger value as the first set pressure as the set flow rate has a larger value.

5. The flow rate controller according to claim 1, wherein the resistor flow rate calculator calculates the resistor flow rate on a basis of a difference between a power of the first measured pressure and a power of the second measured pressure.

6. The flow rate controller according to claim 1, wherein the resistor flow rate calculator calculates the resistor flow rate by multiplying, by a flow rate constant, a difference between a square of the first measured pressure and a square of the second measured pressure.

7. The flow rate controller according to claim 1, wherein the set pressure converter is configured to receive, as the second set pressure, a constant value 0 Torr or more and 900 Torr or less.

8. The flow rate controller according to claim 1, wherein the set pressure converter is configured to receive, as the second set pressure, a constant value 0 Torr or more and 400 Torr or less.

9. The flow rate controller according to claim 1, further comprising a table in which the first set pressure is associated with each set of the second set pressure and the set flow rate, wherein the set pressure converter is configured to refer to the table to output the first set pressure on a basis of the second set pressure and the set flow rate that are received.

10. The flow rate controller according to claim 1, further comprising a valve flow rate calculator that calculates the valve flow rate flowing out of the second valve, on a basis of the resistor flow rate and the second measured pressure,
wherein the control target flow rate is the valve flow rate, and
the flow rate control unit is configured to control the second valve on a basis of a deviation of the valve flow rate from the set flow rate.

11. The flow rate controller according to claim 1, wherein the resistor flow rate calculator is configured to calculate
when the second valve is opened, the resistor flow rate on a basis of the first measured pressure and the second measured pressure, and
when the second valve is fully closed, the resistor flow rate on a basis of the first measured pressure and the second set pressure.

12. A flow rate control method using a flow rate controller including a fluid resistor provided in a flow path, a first valve provided on an upstream side of the fluid resistor, a second valve provided on a downstream side of the fluid resistor, a first pressure sensor provided between the first valve and the fluid resistor, and a second pressure sensor provided between the fluid resistor and the second valve, the method comprising:
a resistor flow rate calculation step of calculating a resistor flow rate that is a flow rate of a fluid flowing through the fluid resistor, on a basis of a first measured pressure measured by the first pressure sensor and a second measured pressure measured by the second pressure sensor;
a flow rate control step of controlling the second valve on a basis of a deviation of a control target flow rate from a set flow rate, the control target flow rate being the resistor flow rate or a valve flow rate that flows out of the second valve and is calculated from the resistor flow rate;

a set pressure converting step of outputting a first set pressure that is a target of a pressure on the upstream side of the fluid resistor, on a basis of the set flow rate and a second set pressure which is a target of a pressure on the downstream side of the fluid resistor and to which a constant value is set; and
a pressure control step of controlling the first valve on a basis of a deviation of the first measured pressure from the first set pressure output in the set pressure converting step.

13. A non-transitory computer-readable recording medium storing a program for a flow rate controller including a fluid resistor provided in a flow path, a first valve provided on an upstream side of the fluid resistor, a second valve provided on a downstream side of the fluid resistor, a first pressure sensor provided between the first valve and the fluid resistor, and a second pressure sensor provided between the fluid resistor and the second valve, the program making a computer function as:
a resistor flow rate calculator that calculates a resistor flow rate that is a flow rate of a fluid flowing through the fluid resistor, on a basis of a first measured pressure measured by the first pressure sensor and a second measured pressure measured by the second pressure sensor;
a flow rate control unit that controls the second valve on a basis of a deviation of a control target flow rate from a set flow rate, the control target flow rate being the resistor flow rate or a valve flow rate that flows out of the second valve and is calculated from the resistor flow rate;
a set pressure converter that outputs a first set pressure that is a target of a pressure on the upstream side of the fluid resistor, on a basis of the set flow rate and a second set pressure which is a target of a pressure on the downstream side of the fluid resistor and to which a constant value is set; and
a pressure controller that controls the first valve on a basis of a deviation of the first measured pressure from the first set pressure output from the set pressure converter.

* * * * *